US008322370B2

(12) United States Patent
Stehr

(10) Patent No.: US 8,322,370 B2
(45) Date of Patent: Dec. 4, 2012

(54) HYDRAULIC SYSTEM WITH A PRESSURE REDUCING VALVE

(75) Inventor: Reinhard Stehr, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 881 days.

(21) Appl. No.: 12/315,954

(22) Filed: Dec. 8, 2008

(65) Prior Publication Data

US 2010/0071788 A1 Mar. 25, 2010

Related U.S. Application Data

(60) Provisional application No. 61/005,763, filed on Dec. 7, 2007.

(51) Int. Cl.
*F16K 11/65* (2006.01)

(52) U.S. Cl. .............. 137/625.25; 137/625.4; 192/85.63

(58) Field of Classification Search ............... 137/625.6, 137/625.25, 625.65, 625.69, 625.4, 625.2; 192/85.63, 85 AA, 85 R, 109 F; 91/433, 91/459

See application file for complete search history.

(56) References Cited

U.S. PATENT DOCUMENTS

| | | | | | |
|---|---|---|---|---|---|
| 2,151,153 | A | * | 3/1939 | Rode et al. | 192/85.63 |
| 3,882,738 | A | * | 5/1975 | Audiffred et al. | 192/85.63 |
| 4,000,795 | A | * | 1/1977 | Patton | 192/109 F |
| 5,868,167 | A | * | 2/1999 | Miki et al. | 137/625.65 |
| 6,148,982 | A | * | 11/2000 | Sen | 192/85.63 |
| 6,997,300 | B2 | * | 2/2006 | Schmidt et al. | 192/85.63 |
| 7,258,212 | B2 | * | 8/2007 | Takagi | 192/85.63 |
| 7,282,005 | B2 | * | 10/2007 | Shimizu et al. | 192/85.63 |
| 7,314,128 | B2 | * | 1/2008 | Gunderson et al. | 192/85.63 |
| 7,559,336 | B2 | * | 7/2009 | Muller et al. | 137/110 |
| 2001/0025662 | A1 | * | 10/2001 | Kawamura et al. | 137/625.65 |
| 2005/0039805 | A1 | * | 2/2005 | Cherney | 137/625.69 |

* cited by examiner

*Primary Examiner* — Craig Schneider
*Assistant Examiner* — Craig J Price
(74) *Attorney, Agent, or Firm* — Alfred J. Mangels

(57) ABSTRACT

A hydraulic system with a pressure reducing valve having at an inlet side a tank connection, a system pressure connection, and an outlet side working pressure connection that is connected to the system pressure connection or to the tank connection through the pressure reducing valve. The pressure reducing valve has a first and a second system pressure connection, wherein the second system pressure connection is pressurized at a significantly higher pressure than the first system pressure connection, and is connected to the working pressure connection through the pressure reducing valve.

11 Claims, 1 Drawing Sheet

HYDRAULIC SYSTEM WITH A PRESSURE REDUCING VALVE

BACKGROUND OF THE INVENTION

1. Field of the Invention

The present invention relates to a hydraulic system with a pressure-reducing valve having a tank connection, a system pressure connection, and a working pressure connection. The hydraulic system is connected to the system pressure connection or to the tank connection through the pressure-reducing valve.

2. Description of the Related Art

Pressure reducing valves that connect a working pressure either to the tank pressure or to the system pressure, or that take intermediate positions in order to modulate the working pressure steplessly, are known from international publication WO 2007/003151 A1.

An object of the present invention is to improve the efficiency of a hydraulic system with a pressure reducing valve having a tank connection, a system pressure connection, and a working pressure connection, wherein the system is connected to the system pressure connection or to the tank connection through the pressure-reducing valve.

SUMMARY OF THE INVENTION

Briefly stated, in accordance with one aspect of the present invention, a hydraulic system with a pressure reducing valve having a tank connection, a system pressure connection, and a working pressure connection, is connected to the system pressure connection or to the tank connection through the pressure reducing valve. The pressure reducing valve has a second system pressure connection that is at a significantly higher pressure than the first system pressure connection and is connected to the working pressure connection through the pressure reducing valve. The tank connection is connected to a tank that contains a working medium, such as hydraulic oil, which is at a tank pressure, preferably ambient pressure. In accordance with an essential aspect of the present invention the two system pressure connections are at different system pressures, both of which are greater than the tank pressure or the ambient pressure. At least one hydraulic system component is connected to the working pressure connection. The hydraulic system component is preferably a clutch that is initially charged at a relatively low system pressure and can be actuated with the relatively high second system pressure as needed.

A preferred exemplary embodiment of the hydraulic system is characterized in that the first system pressure connection is under low pressure and the second system pressure connection is under high pressure. The low pressure is, for example 5 to 10 bar, and can be produced with a low-pressure pump. The high pressure is preferably more than 30 bar, for example 45 bar, and can be produced with a high-pressure pump.

Another preferred exemplary embodiment of the hydraulic system is characterized in that the pressure-reducing valve is a 4/3 directional valve. The 4/3 directional valve has four connections: the working pressure connection, the tank connection, and the two system pressure connections. The working pressure connection can be connected to the tank connection, the first system pressure connection, or the second system pressure connection, in three different selector positions of the pressure reducing valve.

Another preferred exemplary embodiment of the hydraulic system is characterized in that in a relief position the pressure-reducing valve connects the working pressure connection to the tank connection. In the relief position a working chamber, for example in a clutch, is relieved into the tank.

Another preferred exemplary embodiment of the hydraulic system is characterized in that in a low-pressure position the pressure-reducing valve connects the working pressure connection to the first system pressure connection. In the low-pressure position the working chamber is pressurized at low pressure through the pressure-reducing valve, in order to fill a clutch with hydraulic medium, for example.

Another preferred exemplary embodiment of the hydraulic system is characterized in that in a high-pressure position the pressure-reducing valve connects the working pressure connection to the second system pressure connection. In the high-pressure position the working chamber is pressurized at high pressure through the pressure-reducing valve, in order to actuate the clutch which was previously filled under low pressure, for example.

Another preferred exemplary embodiment of the hydraulic system is characterized in that in the high-pressure position the pressure-reducing valve connects the working pressure connection to the first system pressure connection and to the second system pressure connection. That provides the advantage that it is possible to quickly switch over from high pressure to low pressure.

Another preferred exemplary embodiment of the hydraulic system is characterized in that a check valve is situated between a high-pressure region and a low-pressure region, which prevents a relief of pressure from the high-pressure region into the low-pressure region. The check valve prevents an unwanted relief of pressure in the high-pressure region, in particular when the pressure-reducing valve is switched over.

Another preferred exemplary embodiment of the hydraulic system is characterized in that a clutch is connected to the working pressure connection. The hydraulic system in accordance with the invention is especially suitable for clutches that can be filled at a relatively high flow rate, but almost without pressure, i.e., at low pressure. The filling of the clutch preferably takes place from the low-pressure region, whereas the actuation of the clutch preferably takes place from the high-pressure region.

Additional advantages, features and details of the invention are provided in the following description, in which two exemplary embodiments are described in detail.

BRIEF DESCRIPTION OF THE DRAWINGS

The structure, operation, and advantages of the present invention will become further apparent upon consideration of the following description, taken in conjunction with the accompanying drawings in which.

DECRIPTION OF THE PREFERRED EMBODIMENTS

Figure 1:
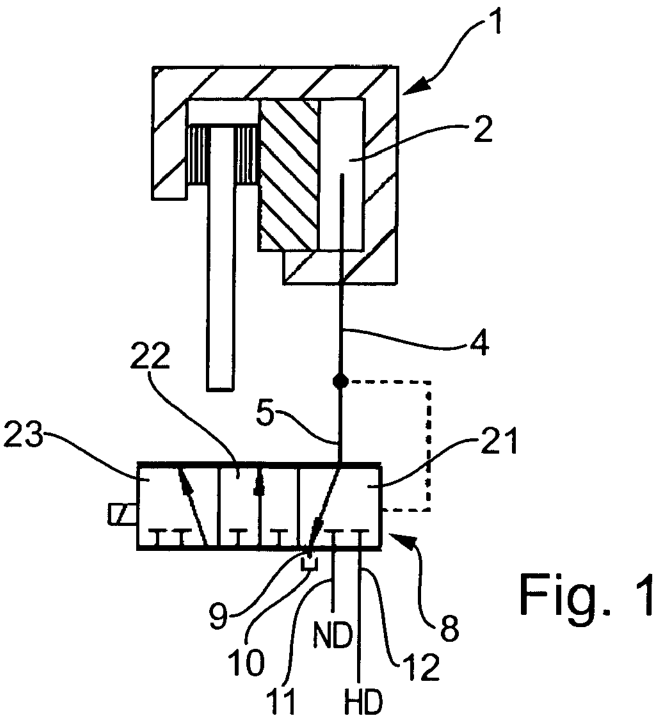
FIG. 1 is a hydraulic circuit diagram of a hydraulic system with a pressure reducing valve in accordance with a first exemplary embodiment of the present invention.
Figure 2:
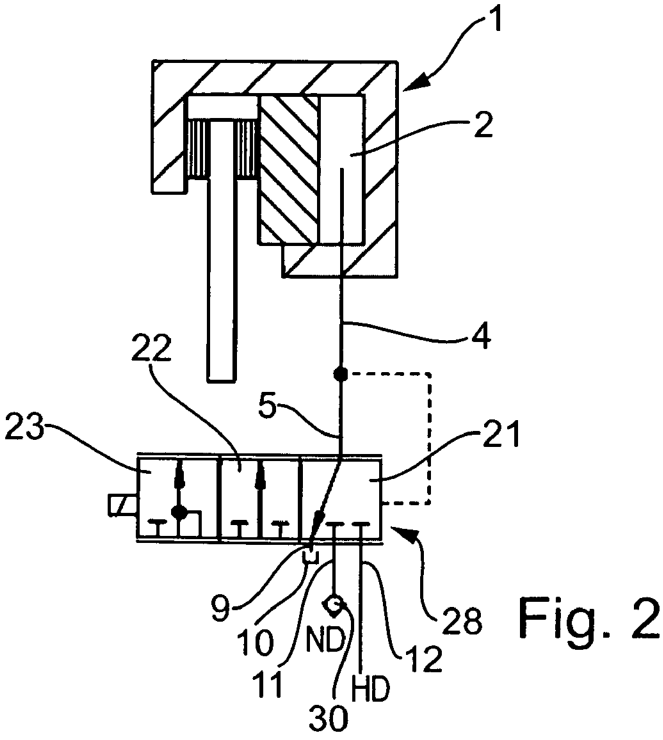
FIG. 2 is a hydraulic system similar to that shown in FIG. 1 and in accordance with a second exemplary embodiment of the present invention.

FIGS. 1 and 2 show two hydraulic systems that are similar and will first be described below together. The same reference numerals are used to designate like parts. The hydraulic system shown in FIGS. 1 and 2 preferably serves to actuate a clutch or a plurality of clutches, for example in a transmission of a motor vehicle. Clutch 1 includes a working chamber 2, which is filled with a hydraulic medium through a hydraulic line 4. The pressure within working chamber 2 can be varied via the pressure in hydraulic line 4 in order to operate clutch 1.

Hydraulic line 4 is connected to a working pressure connection 5 of a pressure reducing valve 8, 28, which is preferably actuated directly or under pilot operation and is preferably in the form of a proportional valve. Pressure reducing valve 8, 28 is a 4/3 directional valve with four connections and three selector positions 21, 22, 23.

In FIGS. 1 and 2, pressure reducing valve 8, 28 is in selector position 21, in which working pressure connection 5 is connected to a tank connection 9, to which a tank 10 is connected that contains hydraulic medium, in particular hydraulic oil, that is exposed to ambient pressure. Selector position 21 is also referred to as the relief position.

In the middle position 22 of pressure reducing valve 8, 28, working pressure connection 5 is connected to a system pressure connection 11. System pressure connection 11 is pressurized at low pressure ND, which is supplied, for example, by a low pressure pump that draws hydraulic medium from tank 10 and conveys it to system pressure connection 11, which is also referred to as a low pressure connection. Similarly, middle position 22 is also referred to as a low-pressure position. The working chamber 2 of clutch 1 is preferably filled through low-pressure connection 11 at a relatively low pressure, but at a high flow rate.

In selector position 23, working pressure connection 5 is connected to another system pressure connection 12, which is pressurized at high pressure HD. The high pressure HD is supplied, for example, by a high pressure pump, which pressurizes at high pressure hydraulic medium which was previously possibly pressurized at low pressure by the low pressure pump, and conveys it to the other system pressure connection 12, which is also referred to as a high pressure connection. Similarly, selector position 23 is also referred to as a high-pressure position. In accordance with another aspect of the present invention, clutch 1 is filled through high-pressure connection 12.

In the starting position of the pressure reducing valve 8, 28 shown in FIGS. 1 and 2, working pressure connection 5 is connected to tank 10 through tank connection 9, so that the working pressure in working chamber 2 is the same as the tank pressure, i.e., the ambient pressure. When clutch 1 is to be actuated, working chamber 2 is first pressurized at a low pressure through working pressure connection 5 and low-pressure connection 11, in order to fill working chamber 2. Only then, when a higher clutch pressure is needed to actuate clutch 1, the valve is switched over from selector position 22 to selector position 23 in order to pressurize working chamber 2 at high pressure through working pressure connection 5 and high pressure connection 12.

In the exemplary embodiment shown in FIG. 1, when switching over from selector position 22 to selector position 23 the low pressure ND is isolated before the high pressure HD is unblocked. That prevents the high pressure HD from being discharged into the low pressure ND.

In the exemplary embodiment shown in FIG. 1, it might prove difficult to design the control edges of pressure reducing valve 8. Furthermore, it could happen that the transition from high pressure to low pressure and vice versa is somewhat delayed due to overlap. In order to circumvent those potential problems, in pressure reducing valve 28 shown in FIG. 2 both system pressure connections 11, 12 are unblocked in selector position 23. A check valve 30 in low-pressure connection 11 prevents an undesired pressure release of the high pressure HD into the low pressure ND from occurring.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A hydraulic system with a pressure reducing valve, said pressure reducing valve comprising: an inlet side tank connection and a first inlet side system pressure connection, and a unitary outlet side working pressure connection that is selectively connected to the first inlet side system pressure connection or to the tank connection through the pressure reducing valve, wherein the valve includes a second inlet side system pressure connection that is pressurized at a different pressure level than that of the first system pressure connection and that is selectively connected to the unitary outlet side working pressure connection through the pressure reducing valve.

2. A hydraulic system in accordance with claim 1, wherein the first system pressure connection is pressurized at a low pressure and the second system pressure connection is pressurized at high pressure.

3. A hydraulic system in accordance with claim 1, wherein the pressure reducing valve is a 4/3 directional valve.

4. A hydraulic system in accordance with claim 1, wherein in a first, relief position of the pressure reducing valve the working pressure connection is connected with the tank connection.

5. A hydraulic system in accordance with claim 1, wherein in a second, low pressure position of the pressure reducing valve the working pressure connection is connected with the first system pressure connection.

6. A hydraulic system in accordance with claim 1, wherein in a third, high pressure position of the pressure reducing valve the working pressure connection is connected with the second system pressure connection.

7. A hydraulic system in accordance with claim 6, wherein in the high pressure position the pressure reducing valve connects the working pressure connection with the first system pressure connection and with the second system pressure connection.

8. A hydraulic system in accordance with claim 7, including a check valve positioned between the first pressure connection and a first pressure source to prevent a release of pressure from the second pressure connection into the first pressure source.

9. A hydraulic system in accordance with claim 1, wherein a clutch is connected to the working pressure connection.

10. A hydraulic system with a pressure reducing valve, said pressure reducing valve comprising: an inlet side tank connection and a first inlet side system pressure connection, and an outlet side working pressure connection that is selectively connected to the first inlet side system pressure connection or to the tank connection through the pressure reducing valve, wherein the valve includes a second inlet side system pressure connection that is pressurized at a different pressure level than that of the first system pressure connection and that is selectively connected to the working pressure connection through the pressure reducing valve, wherein in a third, high pressure position of the pressure reducing valve the working pressure connection is connected with the second system pressure connection, and wherein in the high pressure position the pressure reducing valve connects the working pressure connection with the first system pressure connection and with the second system pressure connection.

11. A hydraulic system in accordance with claim 10, including a check valve positioned between the first pressure connection and a first pressure source to prevent a release of pressure from the second pressure connection into the first pressure source.

* * * * *